(12) United States Patent
Cervelli (10) Patent No.: US 12,539,745 B2
(45) Date of Patent: Feb. 3, 2026

(54) ROOF ASSEMBLY FOR A CONVERTIBLE MOTOR VEHICLE

(71) Applicant: FERRARI S.P.A., Modena (IT)

(72) Inventor: Daniele Cervelli, Modena (IT)

(73) Assignee: FERRARI S.P.A., Modena (IT)

( * ) Notice: Subject to any disclaimer, the term of this patent is extended or adjusted under 35 U.S.C. 154(b) by 358 days.

(21) Appl. No.: 18/316,176

(22) Filed: May 11, 2023

(65) Prior Publication Data

US 2023/0364976 A1 Nov. 16, 2023

(30) Foreign Application Priority Data

May 12, 2022 (IT) .......................... 102022000009812

(51) Int. Cl.
*B60J 7/19* (2006.01)
*B60J 7/16* (2006.01)
(Continued)

(52) U.S. Cl.
CPC ............. *B60J 7/194* (2013.01); *B60J 7/1664* (2013.01); *E05B 83/00* (2013.01); *E05C 1/04* (2013.01); *E05C 3/14* (2013.01)

(58) Field of Classification Search
CPC ........ B60J 7/194; B60J 7/1664; B60J 7/1851; B60J 7/192; E05C 1/04; E05C 3/14
(Continued)

(56) References Cited

U.S. PATENT DOCUMENTS

| | | | | |
|---|---|---|---|---|
| 1,574,222 A | * | 2/1926 | Wensel ..................... | E05C 1/04 292/145 |
| 3,129,025 A | * | 4/1964 | Krueger ................. | B60J 7/1851 292/196 |

(Continued)

FOREIGN PATENT DOCUMENTS

| | | | |
|---|---|---|---|
| DE | 10105598 B4 | * 7/2009 | ............ B60J 7/0053 |
| DE | 102009009595 A1 | 8/2010 | |

(Continued)

OTHER PUBLICATIONS

Italian Search Report for Application No. 102022000009812; Filing Date: May 12, 2022; Date of Mailing—Nov. 22, 2022, 7 pages.

*Primary Examiner* — Hilary L Gutman (74) *Attorney, Agent, or Firm* — CANTOR COLBURN LLP (57) ABSTRACT

A roof assembly for a convertible motor vehicle includes a roof to be placed in contact with a frame of the motor vehicle in a closed roof position, a manual locking device carried by the roof and capable of being operated by hand when the roof is in the closed roof position according to a first operating mode, in which the manual locking device cooperates with the frame to carry out a first constraining action in order to secure the roof to the frame in the closed roof position, and according to a second operating mode, in which the locking device refrains from cooperating with the frame, thus removing the first constraining action, characterized in that it further includes an additional locking device carried by the roof to automatically exert a second constraining action to secure the roof to the frame at least in response to a positioning or a movement of the roof in/to the closed roof position, the additional locking device having release means capable of being operated by hand in order to remove the second constraining action.

11 Claims, 10 Drawing Sheets

(51) Int. Cl.
  *E05B 83/00*  (2014.01)
  *E05C 1/04*  (2006.01)
  *E05C 3/14*  (2006.01)

(58) Field of Classification Search
  USPC .......................................................... 296/218
  See application file for complete search history.

(56) References Cited

U.S. PATENT DOCUMENTS

| | | | | |
|---|---|---|---|---|
| 3,603,636 | A * | 9/1971 | Carella ...................... | B60J 7/19 296/218 |
| 3,799,593 | A * | 3/1974 | Dielman ................... | E05C 1/04 292/357 |
| 4,367,454 | A * | 1/1983 | Modica ............... | B60R 25/1001 340/426.34 |
| 4,626,026 | A * | 12/1986 | Hasegawa ................. | B60J 7/11 296/213 |
| 4,821,394 | A * | 4/1989 | Martinez-Vera ......... | B60J 7/106 296/218 |
| 4,869,549 | A * | 9/1989 | Londeck ................... | B60J 7/19 292/DIG. 55 |
| 5,154,479 | A * | 10/1992 | Sautter, Jr. ............. | B60J 7/1851 296/121 |
| 5,269,586 | A * | 12/1993 | Hahn ..................... | B60J 7/1851 292/DIG. 43 |
| 5,284,378 | A * | 2/1994 | Sautter, Jr. ................ | E05C 5/00 296/121 |
| 5,839,778 | A * | 11/1998 | Schaible ................ | B60J 7/1855 296/121 |
| 6,283,531 | B1 * | 9/2001 | Tanigawa ................. | B60J 7/106 296/117 |
| 2004/0021339 | A1 * | 2/2004 | Taylor ........................ | B60J 7/19 296/121 |
| 2006/0038411 | A1 * | 2/2006 | Plesternings .......... | B60J 7/1851 292/144 |
| 2014/0246883 | A1 * | 9/2014 | Inzerillo ................. | B60J 7/043 296/216.04 |
| 2017/0356222 | A1 * | 12/2017 | Braz ........................ | E05C 1/04 |

FOREIGN PATENT DOCUMENTS

| | | | |
|---|---|---|---|
| EP | 657607 A1 | * 6/1995 | |
| EP | 884208 A1 | * 12/1998 | |
| WO | WO-03039898 A1 | * 5/2003 | ............ B60J 7/1851 |

* cited by examiner

ROOF ASSEMBLY FOR A CONVERTIBLE MOTOR VEHICLE

CROSS-REFERENCE TO RELATED APPLICATIONS

This patent application claims priority from Italian patent application no. 102022000009812 filed on May 12, 2022, the entire disclosure of which is incorporated herein by reference.

TECHNICAL FIELD

The invention relates to a roof assembly for a convertible motor vehicle.

PRIOR ART

As it is known, a convertible motor vehicle is motor vehicle that can be driven with or without a roof covering the passenger compartment.

In other words, the roof of the motor vehicle can be removed from a closed roof position, in which the roof covers the passenger compartment.

When a user of the convertible motor vehicle wants the passenger compartment to be covered by the roof, the user has to move the roof to the closed roof position and secure the roof to a frame portion of the motor vehicle.

In particular, the convertible motor vehicle has one or more fixing devices, which can be used by the user to secure the roof the frame portion after the roof has been moved to the closed roof position.

The fixing devices often operate in an exclusively manual manner.

Generally speaking, the safety with which the roof is secured to the frame portion needs to be increased.

As a matter of fact, a failed anchoring to the frame portion could cause serious damages during the use of the convertible motor vehicle.

For instance, the roof could separate itself from the rest of the convertible motor vehicle and swirl in the air in an extremely dangerous manner both for people and for objects standing nearby.

The object of the invention is to fulfil the need discussed above, preferably in a simple and reliable fashion.

DESCRIPTION OF THE INVENTION

Said object is reached by a roof assembly as defined in claim 1.

The dependent claims define special embodiments of the invention.

BRIEF DESCRIPTION OF THE DRAWINGS

Hereinafter, an embodiment of the invention will be described, in order to allow the latter to be better understood, by way of non-limiting example and with reference to the accompanying drawings, wherein.

EMBODIMENTS OF THE INVENTION

Figure 1:
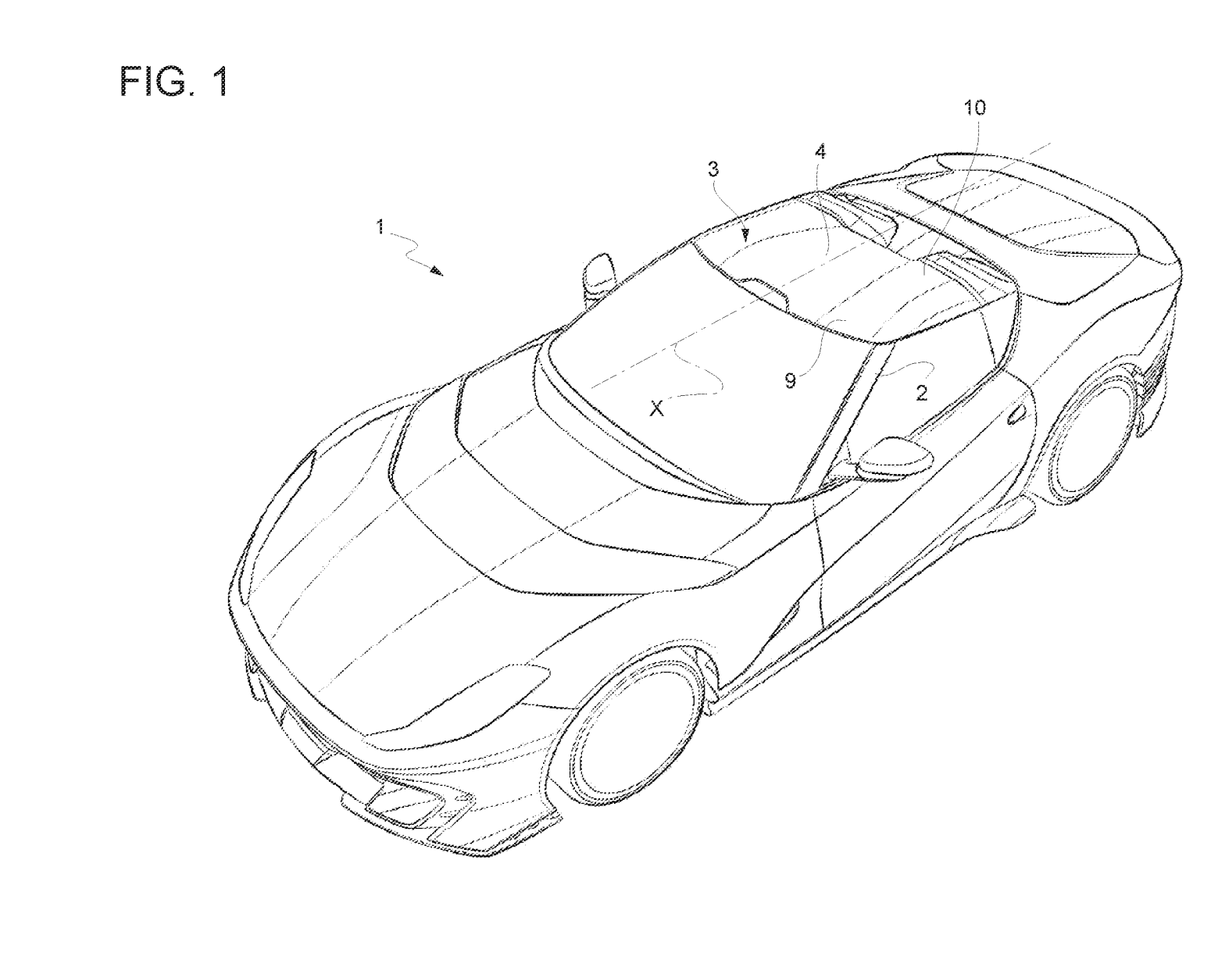
FIG. 1 is a perspective view of a convertible motor vehicle comprising a roof assembly according to the invention.

In FIG. 1, reference number 1 is used to indicate, as a whole, a convertible motor vehicle.

Like all motor vehicles, the motor vehicle 1 has a normal forward driving direction and comprises a passenger compartment to accommodate at least one driver and, if necessary, one or more passengers.

The motor vehicle 1 comprises a frame 2, which defines or surrounds the passenger compartment.

Furthermore, the motor vehicle 1 comprises a roof assembly 3, which can be secured to the frame 2.

The assembly 3 comprises a roof 4, namely—more precisely—a panel or sheet metal, having a shape and dimensions that are such as to cover the passenger compartment from the top in closed roof position. As it is known, the roof 4 could be different from a panel or sheet metal and be rather flexible or comprise a fabric, without losing generality.

In the closed roof position, the roof 4 is placed in contact with the frame 2; the frame 2 can support the roof 4 in the closed roof position.

Though, placing the roof 4 in the closed roof position is not enough to secure the roof 4 to the frame. As a matter of fact, the mere shifting of the roof 4 to the closed roof position determines the contact between the roof 4 and the frame 2, so that the roof 4 can at least be held in the closed roof position through friction, but the friction does not determine an actual stable constraint.

A gust of wind during the use of the motor vehicle 1 could actually be enough to break the friction-induced bond between the roof 4 and the frame 2, so that the roof 4 separates itself from the frame 2 causing damages to objects or people standing nearby.

Therefore, the term "constraint" and the verb "to constrain" are used herein with the meaning of stable constraint and creating a stable constraint, i.e. a bond that can be broken only by breaking the components creating the bond.

In order to constrain or secure the roof 4 to the frame 2, the assembly 3 comprises at least one manual locking device 5 configured to be operated by hand when the roof 4 is in the closed roof position.

Figure 2:
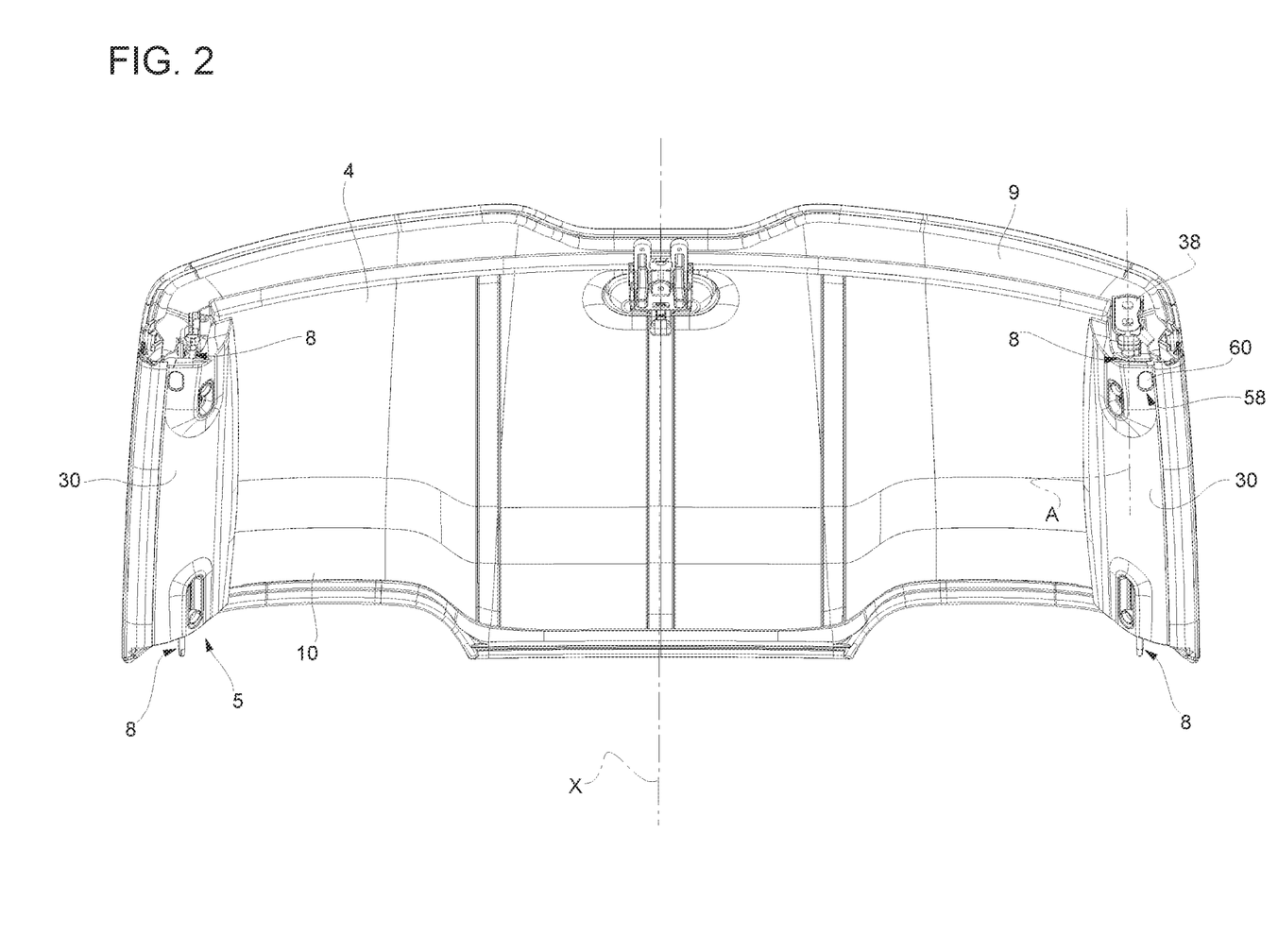
FIG. 2 is a view from the bottom of the roof assembly.
Figure 3:
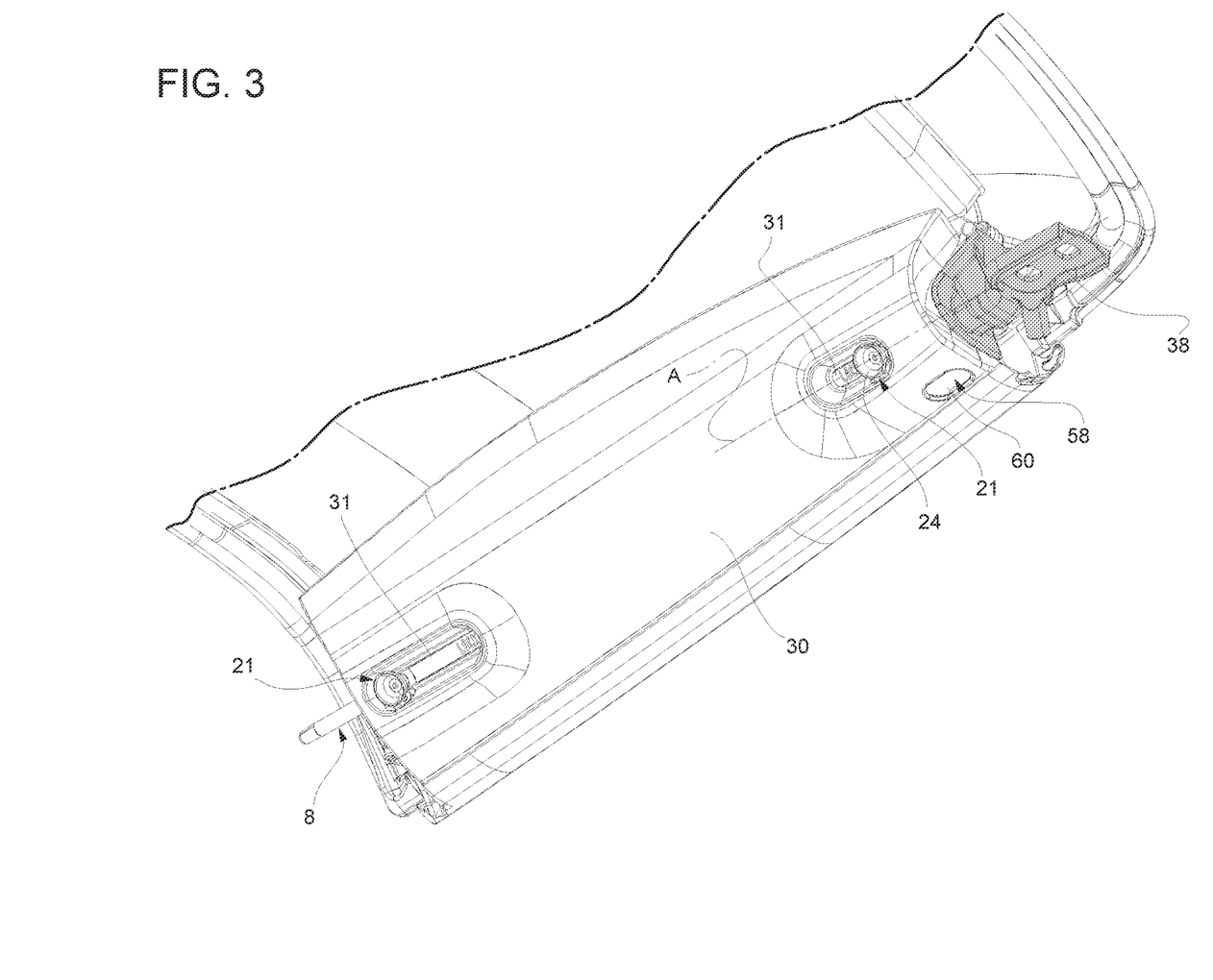
FIG. 3 is a perspective view of an inner portion of the roof assembly.

The device 5 is carried by the roof 4. More in detail, the device 5 has at least a structure that is carried by the roof 4 in a fixed position; i.e. the structure 6 is fixed relative to the roof 4 as is generally shown in FIG. 2.

The device 5 has two operating modes. A first operating mode involves manually securing or constraining the roof 4 to the frame 2 in the closed roof position.

In this operating mode, the device 5 cooperates or, more in particular, comes or is manually brought into contact with the frame 2 and, consequently, carries out or exerts a first constraining action to secure or constrain the roof 4 to the frame 2 in the closed roof position.

On the other hand, a second operating mode is contrary to the first operating mode and involves removing the first constraining action. In other words, the device 5 refrains or is manually caused to refrain from cooperating with or, more in particular, contacting the frame 2, so that the device 5 ceases to exert the first constraining action.

More in detail, the device 5 comprises at least one lock bolt 8, in this case a plurality of lock bolts 8, in particular at least four lock bolts 8 arranged in pairs at the front and rear ends 9, 10 of the roof 4, more precisely at the four corners of the roof 4.

Hereinafter, terms such as "front" and "rear" can be interpreted with reference to the forward moving direction of the motor vehicle 1 or to identify a suitable orientation for the positioning and/or the installation relative to the motor vehicle 1.

The lock bolts 8 preferably are the same, meaning that the features described for one lock bolt 8 also apply to all the others. Therefore, the description only relates to one lock bolt 8.

Figure 4:
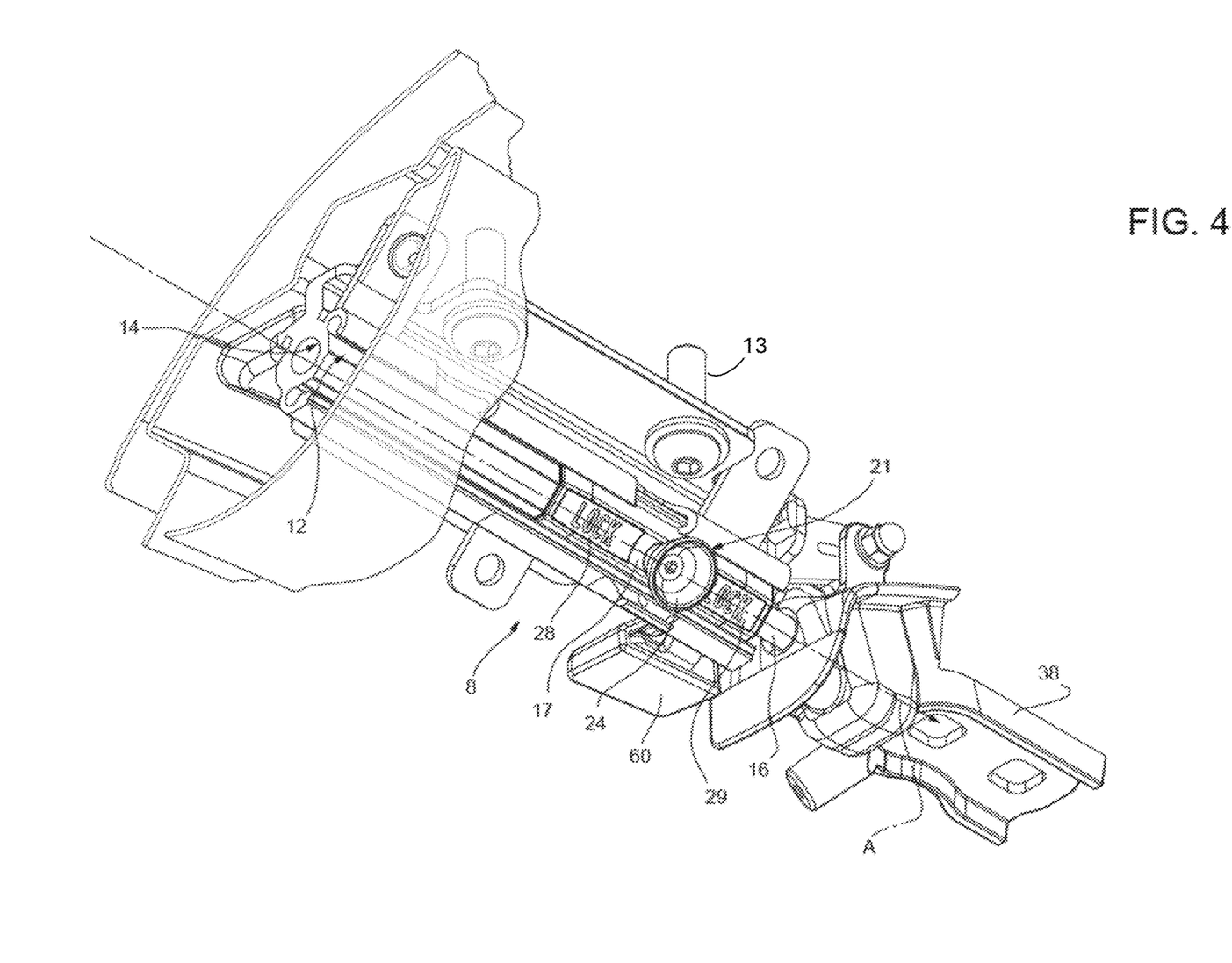
FIG. 4 shows, in perspective, a locking assembly that is part of the roof assembly.
Figure 5:
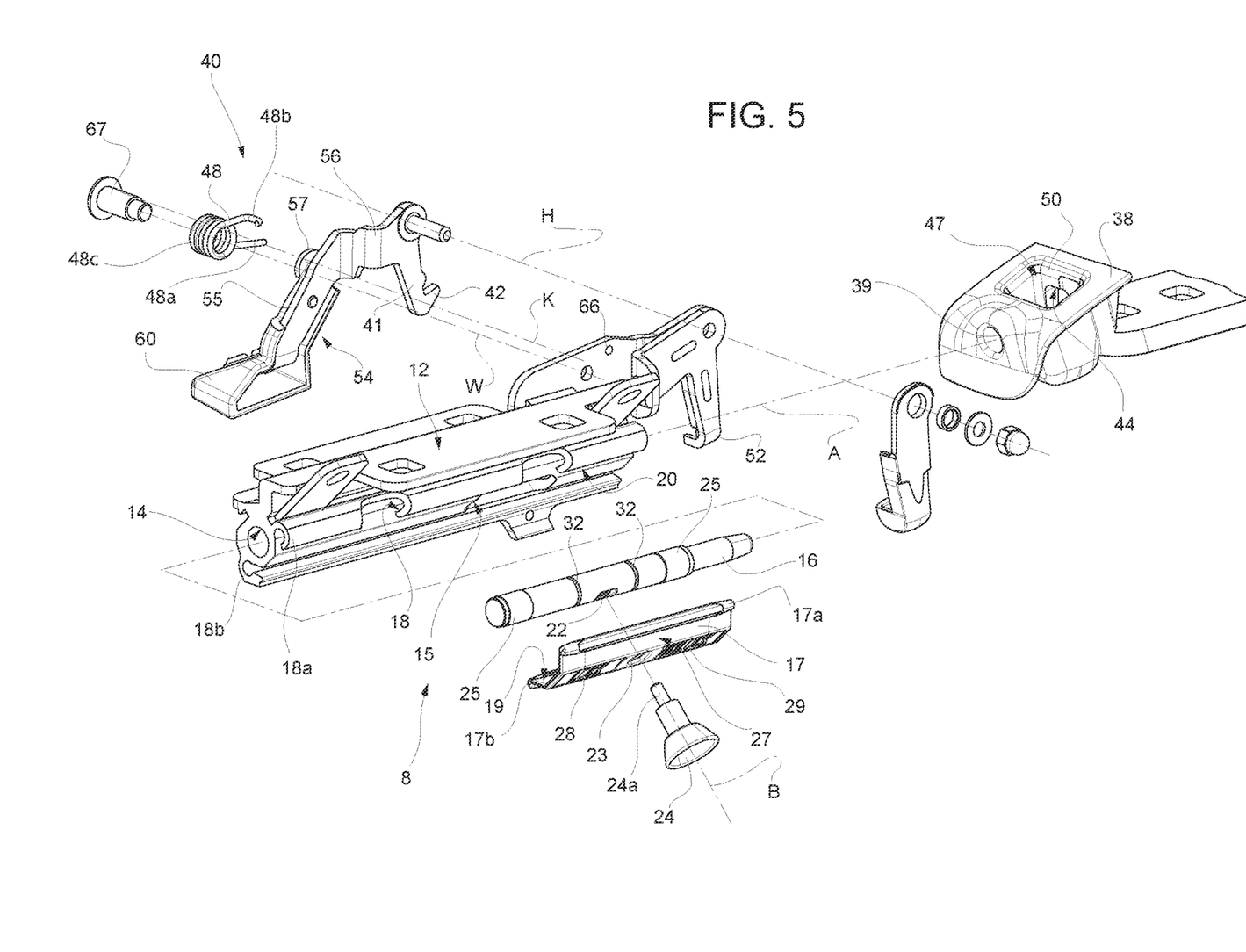
FIG. 5 is an exploded view of the locking assembly of FIG. 4, FIGS. 6, 7, 8 are side views showing phases of a hooking of the roof assembly to a frame portion of the convertible motor vehicle through the locking assembly.

The lock bolt 8 comprises a guide body 12, which is fixed relative to the roof 4, in particular is fastened to the latter, more in particular by means of known threaded member 13 (FIG. 4).

The guide body 12 extends along a straight axis A, which, in particular, is parallel to the forward driving direction of the motor vehicle 1 or to the direction X, along which the roof 4 extends between the ends 9, 10.

Furthermore, the guide body 12 has a hole 14 extending along the axis A; in particular, the hole 14 is a through hole.

The guide body 12 is manufactured as one single piece, in particular through extrusion. More in particular, the guide body 12 is processed through material removal after having been extruded.

Furthermore, the guide body 12 specifically has a slot 15 obtained in depth along an axis B, which is transversal or, more precisely, orthogonal to the axis X, until it communicates with the hole 14.

The lock bolt 8 further comprises a pin 16 coupled to the guide body 12 so as to slide along the axis A inside the hole 14. In other words, the pin 16 is inserted in the hole 14, which allows the pin 16 to slide along the axis A relative to the guide body 12. Hence, the guide body 12 has the function of guiding the sliding of the pin 16 along the axis A.

More specifically, the pin 16 is supported so as to slide relative to the guide body 12 by means of bushings 25 of the lock bolt 8.

In particular, the bushings 25 are fixed relative to the pin 16 around the axis A and the outer side surface of the pin 16.

The pin 16 is inserted through the bushings 25 along the axis A.

The bushings 25 slide along the guide body 12 inside the hole 14.

For example, the bushings 25 are coupled to the pin 16 by being fitted on the pin 16 through interference.

In the embodiment shown herein, the guide body 12 also has the function of guiding the sliding of a slide 17 along the axis A. Indeed, the guide body 12 defines a guide 18, in particular formed by appendages 18a, 18b bent like a hook around respective axes parallel to the axis A. For example, the appendages 18a, 18b can be flexible.

The slide 17 is part of the lock bolt 8 and has, in particular, sliding elements 17a, 17b embraced and, hence, supported by the appendages 18a, 18b so as to slide along respective axes parallel to the axis A.

The slide 17 further has an inner surface 19 facing an outer surface 20 of the guide body. In particular, the inner surface 19 is concave towards the axis A, like the outer surface 20.

The slot 15 creates a corresponding opening on the outer surface 20; the opening is partially covered by the inner surface 19.

Furthermore, the lock bolt 8 comprises a knob 21, which is fixed relative to the pin 16 and projects relative to the guide body 12 along the axis B through the slot 15.

Specifically, the pin 16 has a hole 22 along the axis B. More specifically, the slide 17 also has hole 23 along the axis B, which, hence, is aligned with the hole 22. The hole 23 is a through hole.

The knob 21 comprises a portion 24 suitable for being grabbed by a user as well as a pin 24a, which entirely goes through the hole 23 and is inserted in the hole 22, for example through interference, so that the knob 21 is fixed relative to the pin 16. Hence, the pin 24a goes through the slot 15 and ends inside the hole 14.

In this way, the user can use the knob 21 to move the pin 16 along the axis A, at least between two lock bolt positions.

The lock bolt positions include a closing position, in which the roof 4 is secured to the frame 2, and an opening position, in which the lock bolt 8 does not exert any constraining action between the roof 4 and the frame 2.

Therefore, in general, the pin 16 is coupled to the guide body 12 so as to slide along the axis A inside the hole 14 between the lock bolt positions.

The pin 16 is configured to engage and disengage, respectively, the hole 39, namely the pin seat, when it is in the closing position and in the opening position, respectively.

The engagement of the pin 16 in the hole 39, namely in the pin seat, carries out the first constraining action.

The perimeter of the slot 15 defines the limits of the travel of the knob 21 and, hence, of the slide 17 and of the pin 16 along the axis A; the limits correspond to the opening position and to the closing position, respectively.

The slide 17 preferably has a surface 27 opposite the inner surface 19 relative to the axis B.

In other words, the surface 27 faces the passenger compartment of the motor vehicle 1.

The surface 27 has two identifiers 28, 29 on the opposite sides of the knob 21 according to the axis A. The identifiers 28, 29 are unequivocally associated with the closing and opening position, respectively. For example, the identifiers 28, 29 can comprise two distinct inscriptions (for example, "lock" and "unlock") clearly evocative of the closing and opening positions.

The lock bolt 8 is partially hidden from the view of the user by a covering element 30, which is fixed relative to the roof 4. The covering element 30, which is part of the assembly 3, has at least one window 31 arranged along the axis A so that the window 31 exposes, from the passenger compartment, the sole identifier 28 of the identifiers 28, 29, when the pin 16 is moved to the closing position, and the sole identifier 29 of the identifiers 28, 29, when the pin 16 is moved to the opening position.

The knob 21 clearly goes through the window 31, so that the user can use the knob 21. Furthermore, as directly derivable from the above, the slide 17 follows the translation of the pin 16, since the pin 25 of the knob 20 completely goes through the hole 23. Hence, the pin 25 pushes the slide 17 at the perimeter of the hole 23.

The pin 16 conveniently has an outer side surface around the axis A with two radial grooves 32 around the axis A.

Accordingly, the guide body 12 has a further hole 33, which extends along an axis C transversal or, more precisely, orthogonal to the axis A and communicates with the hole 14. The axis C could be parallel to the axis B, even though this is not necessary.

The hole 33 is a dead hole, so that it is delimited by a base wall transversal to the axis C and facing the hole 14.

The hole 33 accommodates a spring 34, to which an engagement element 35, in particular a spherical or semi-spherical body, is fixed.

The engagement element 35 is suitable for engaging each one of the grooves 32, specifically with a slight interference.

The spring 34 is configured or pre-loaded to push the engagement element 35 towards the axis A along the axis C.

More in detail, the spring 34 is an axial spring loaded along the axis C and supported by the base wall delimiting the hole 33.

Precisely, an end of the spring 34 is fixed at the base wall, whereas the opposite end of the spring 34 carries the engagement element 35 like a head of the spring 34 itself.

The spring 34 and the engagement element 35 are part of the lock bolt 8.

The relative position of the grooves 32 with respect to the hole 33 along the axis A is such that the axis C goes through one of the grooves 32, when the pin 16 is in the closing position, and through the other one of the grooves 32, when the pin 16 is in the opening position.

In this way, the elastic reaction or thrust of the spring 34 causes the engagement element 35 to engage each one the grooves 32, respectively, in the two lock bolt positions of the pin 16.

By so doing, the interaction between the engagement element 35 and the pin 16 inside the grooves 32 slightly increases the necessary force to be applied by the user along the axis A in order to remove the pin 16 from one of the lock bolt position and, consequently, move the pin 16 along the axis A.

Indeed, the elasticity of the spring 24 allows the engagement element 25 to retreat towards the inside of the hole 33 in response to a force applied to the pin 16 along the axis A; in this way, the engagement element 25 can project out of the grooves 32 and, hence, subsequently slide on the outer side surface of the pin 16 due to the thrust of the spring 24.

The grooves 32 are arranged on the opposite sides of the knob 21 along the axis A.

Like in the embodiment shown herein, the lock bolt 8 can preferably comprise several holes 33 along respective axes C, which are transversal or, more precisely, orthogonal to the axis A, and the same number of springs 24 respectively accommodated in the holes 33 and carrying respective engagement elements 25 to engage each one of the grooves 32.

The frame 2 comprises a coupling interface 38 configured to cooperate in contact with the device 5 in the first operating mode.

Possibly, the coupling interface 38 can be considered as part of the assembly 3 with or without the remaining part of the frame 2.

More precisely, the coupling interface 38 has at least one hole 39 for each lock bolt 8.

The hole 39 extends along the axis A and is aligned with the pin 16 along the axis A, so that the pin 16 is inserted in the hole 39, when the pin 16 is in the closing position.

Hence, the hole 39 is configured to, namely has a position and dimensions that are such as to receive the pin 16 on the inside, when the pin 16 is in the closing position.

In other words, the hole 39 defines a pin seat obtained on the frame 2 or, more precisely, on the coupling interface 38.

In particular, the hole 39 is configured so as to be engaged by the pin 16 with a slight interference, namely so that a friction arises between the pin 16 and the walls delimiting the hole 39, provided that the pin 16 can anyway be extracted from the hole 39 without damages, so that it can go back to the opening position.

The interference coupling between the hole 39 and the pin 16 is highly advantageous, but not strictly necessary, since a coupling with a clearance, in particular a slight one, could equally be suitable for obtaining a cooperation between the device 5 and the frame 2 resulting in the first constraining action.

The hole 39 is aligned with the hole 14 along the axis A.

In the opening position, the pin 16 is out of the hole 39, so that it does not cooperate or ceases to cooperate with it to carry out the first constraining action.

Advantageously, the assembly 3 further comprises an additional locking device 40 carried by the roof 4 and configured to automatically exert or carry out, namely without further manual operations of the user, a second constraining action to secure the roof 4 to the frame 2 at least in response to a positioning of the roof 4 in the closed roof position or to a movement of the roof 4 ending in the closed roof position.

The positioning or the movement of the roof 4 can take place by means of a hand-operated action of the user.

For example, the movement can occur by releasing the roof 4 from a position located above the closed roof position, so that the roof 4 falls, due to gravity, on the frame 2 or, more in particular, on the coupling interface 38.

Or, according to another example, the roof 4 can manually be pushed downwards against the frame 2 or, more precisely, against the coupling interface 38 towards the closed roof position.

Or, according to another example, the roof 4 can even be accompanied to the closed roof position.

In any case, the device 40 is configured to carry out the second constraining action with no need for further operations of the user in addition to the ones carried out for the positioning or the movement, namely to lead the roof 4 to the closed roof position.

In other words, the movement is sufficient to allow the device 40 to operate or activate itself accordingly, thus carrying out the second constraining action.

The device 40 can be structurally and functionally independent of the device 5, so that each one of the devices 5, 40 could be absent without for this reason affecting the operation of the other one of the devices 5, 40.

In this case, the assembly 3 comprises two devices 40 arranged at the end 9, in particular of the corners of the roof 4, more in particular close to the lock bolts 8.

The devices 40 are preferably coupled to the lock bolts 8 or carried by them at the end 9. In particular, each device 40 is carried by the respective guide body 12.

Each one of the features of one of the devices 40 can be applied to the other one of the devices 40, which is why only one of them will be described in detail.

According to an example, the device 40 could comprise a snap coupling mechanism configured to secure the roof 4 to the frame 2 or, more precisely, to the coupling interface 38 in response to the aforesaid movement.

For instance, the snap coupling mechanism could perform the snap due to or by means of the weight of the roof 4. In other words, gravity could help start the snap.

The starting of the snap corresponds to or results in the creation of the second constraining action.

Specifically, the device 40 or, more specifically, the snap coupling device comprises an arm 41 having a hook end 42 configured to be hooked to the frame 2 or, more precisely, to the coupling interface 38, for example in response to the movement of the roof 4, thus exerting the second constraining action.

The arm 41 is carried by the roof 4 or, more precisely, by the lock bolt 8 or, even more precisely, by the guide body 12.

In particular, the coupling interface 38 has a recess 44 configured to, i.e. having a shape and a position that are such as to receive the hook end 42.

More in particular, the recess 44 is arranged in front of the hole 39 along the axis A. In other words, the axis A, along which the hole 39 extends, is directed towards the recess 44.

Figure 6:
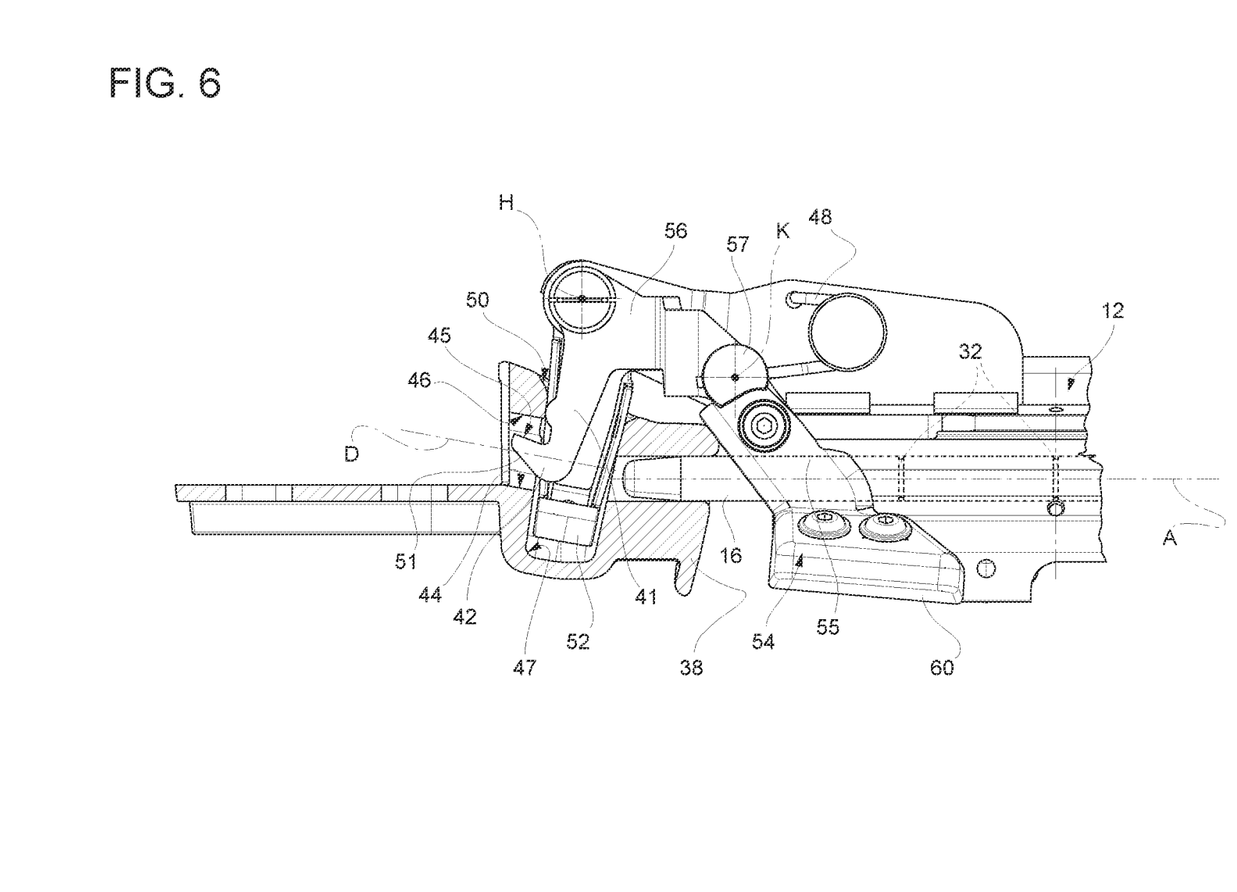

The recess 44 has an own axis D, which can be coplanar to the axis A, but not necessarily parallel to it. In FIG. 6, the axis D is incident to the axis A. Clearly, the axis D could also be parallel to the axis A, instead, according to variants that are not shown herein.

FIG. 6 shows the hook end 42 inside the recess 44. Here, the hook end 42 has a face 45, in particular the upper one, facing a face 46 delimiting the recess 44, in particular at the top.

According to FIG. 6, a direction orthogonal to the face 45 is transversal to the axis D.

With the hook end 42 inside the recess 44, if the roof 4 were lifted or moved upwards for whatever reason, the face 45 would hit against the face 46. This would prevent the roof 4 from being lifted or moved upwards. Therefore, the second constraining action comprises or is carried out by the face 45 striking against the face 46.

In the embodiment shown herein, the coupling interface 38 has a cavity 47, specifically arranged between the hole 39 and the recess 44, according to the axis D or the axis A. The cavity 47 communicates at least with the recess 44.

In particular, the cavity 47 also communicates with the hole 39.

The cavity 47 is shaped in a suitable manner to accommodate the arm 41.

In the closed roof position, the arm 41 is inserted in the cavity 47. Therefore, the positioning of the roof 4 in the closed roof position corresponds to the insertion of the arm 41 in the cavity 47.

The arm 41 is preferably hinged to the roof 4 or, more precisely, to the guide body 12 around a hinge axis H, specifically orthogonal to the plane containing the axes D, A, hence, more generally, orthogonal to the axis A or to the forward driving direction of the motor vehicle 1.

The axis H also is orthogonal to the direction along which the roof extends between the ends 9, 10.

Furthermore, the axis H is transversal relative to an axis orthogonal to the roof 4.

In this case, the arm 41 can rotate around the hinge axis.

In particular, the arm 41 or the axis H is arranged in a position such that the arm 41 rotates in response to a movement of the roof 2 ending in the closed roof position. More in particular, the rotation takes place according to a first rotation direction.

Alternatively, according to variants that are not shown herein, the arm 41 could be coupled to the roof 4 in a different manner, for example by means of a prismatic joint.

In general, the arm 41 is coupled to the roof 4 or, more precisely, to the guide body 12 so that it can move relative to the latter, for example manually, between a first and a second position. When the arm 41 is in the first position, the roof 4 is placeable in the closed roof position, possibly without the arm 41 coming into contact with the frame 2 or the coupling interface 38 until the moment in which the closed roof position is reached, in which the arm 41 possibly touches the frame 2.

In other words, the arm 41, in the first position, can be inserted in the cavity 47, possibly without the arm 41 immediately coming into contact with the coupling interface 38, but only after a partial insertion in the cavity 47 or, possibly, until the moment in which the closed roof position is reached.

A shift of the arm 41 from the first position to the second position, when the roof 4 is in the closed roof position, corresponds to the introduction of the hook end 42 in the recess 44 and, hence, to the creation of the second constraining action.

Therefore, the above-mentioned snap would be defined by said shift. Hence, in particular, the snap takes place with the arm 41 inside the cavity 47.

In this case, a shift from the second position to the first position corresponds to a rotation of the arm 41 around the axis H according to the aforesaid first rotation direction. A second rotation direction of the arm 41 is contrary to the first rotation direction.

Figure 7:
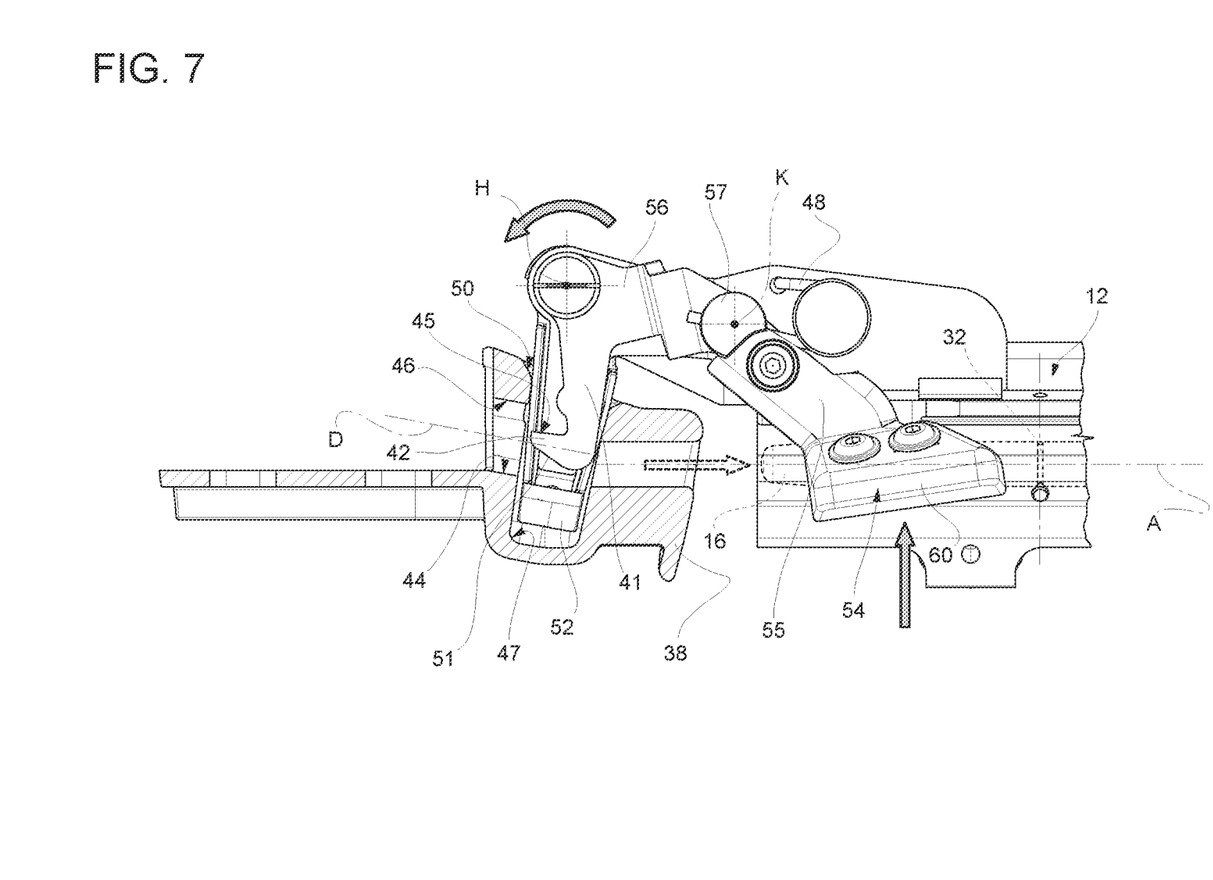

As shown in FIGS. 6 and 7, the rotation of the arm 41 according to the first rotation direction is suitable for releasing the hook end 42 from the frame 2 or, more precisely, from the coupling interface 38.

More in general, a shift of the arm 41 from the second position to the first position is suitable for releasing the hook end 42 from the frame 2 or, more precisely, from the coupling interface 38.

The device 40 comprises an elastic member 48, which couples the arm 41 to the roof 4. Specifically, the elastic member 48 couples the arm 41 to the guide body 12.

The elastic member 48 is configured to exert an elastic reaction in response to a movement of the arm 41 from the second position to the first position.

The elastic reaction is directed towards the second position, i.e. in an opposite direction relative to the movement of the arm 41.

Therefore, the second position of the arm 41 is a balance position for the arm 41.

In this case, the elastic member 48 is configured to exert the elastic reaction at least in response to a rotation of the arm 41 according to the first rotation direction, more precisely starting from the second position.

Here, the elastic reaction is an elastic reaction torque around the axis H according to the second rotation direction.

The rotation of the arm 41 according to the first rotation direction can result from the movement of the roof 4 ending in the closed roof position.

Hence, the aforesaid snap is caused by the elastic member 48, when the roof 4 is in the closed roof position with the arm 41 in the first position, namely, more precisely, inside the cavity 47.

In particular, the arm 41 can enter the cavity 47 only in the first position. In other words, the roof 4 can reach the closed roof position only if the arm 41 is in the first position.

The insertion inside the cavity 47, i.e. the positioning of the roof 4 in the closed roof position, can occur in many ways, for example by manually moving the arm 41 to the first position and by introducing the latter in the cavity 47.

Alternatively, since the elastic member 48 is yielding, the arm 41 can be inserted inside the cavity 47 by pushing it or, more precisely, by pushing the hook end 42 against the frame 2 or, more precisely, against the coupling interface 38 towards the cavity 47. Even if the arm 41 is in the second position, the reaction of the frame 2 or of the coupling interface 38 to the thrust of the arm 41 towards the cavity 47 causes the movement of the arm 41 towards the first position, against the elastic reaction of the elastic member 48.

When the thrust is sufficient to move the arm 41 to the first position, the latter slips into the cavity 47 by means of the thrust itself.

Inside the cavity 47, the hook end 42 sees the recess 44.

In other words, when the arm 41 is inside the cavity 47, the recess 44 offers the arm 41 or, more precisely, the hook end 42 space to move.

Therefore, the frame 2 or the coupling interface 38 does not react in the area of the recess 44 against the reaction of the elastic member 48, so that the hook end 42 enters the recess 44 by means of a movement of the arm 41 from the first position to the second position caused by the reaction of the elastic member 48. In other word, the snap takes place.

The face 45 preferably has at least a portion that is transversal or orthogonal to the axis H. Hence, when the face 45 strikes against the face 46, the face 45 receives a reaction force that is orthogonal to the axis H. Therefore, the torque generated by said reaction force around the axis H evidently is zero. In this way, the hook end 42 remains locked inside the recess 44.

The thrust can clearly include the contribution of the force of gravity or even be defined by the weight of the roof 4, for example allowed to move to the closed roof position through gravity.

Therefore, the insertion of the arm 41 in the cavity 47 can also take place by means of the weight of the roof 4. The weight constitutes or contributes to the thrust.

The coupling interface 38 preferably comprises a guide surface 50, in particular at a mouth of the cavity 47.

More in particular, the guide surface 50 is joined to the recess 44 or, more in particular, to the face 46.

The guide surface 50 is specifically shaped to guide or accompany the insertion of the arm 41 or, more precisely, of the hook end 42 in the cavity 47 in response to a thrust of a back 51 of the hook end 42 against the guide surface 50 towards the recess 44 or the cavity 47.

The guide surface 50 accompanies or determines the movement of the arm 41 from the second position to the first position in response to the positioning or movement ending in the closed roof position.

Specifically, the guide surface 50 accompanies the rotation of the arm 41 in the first rotation direction, in particular against the elastic reaction of the elastic member 48.

Once the arm 41 is in the first position thanks to the guide surface 50, the arm 41 can be more deeply inserted in the cavity 47.

Here, the elastic member 48 causes the movement of the arm 41 from the first position to the second position, so that the hook end 42 enters the recess 44 and is hooked to the coupling interface 38.

In order to facilitate the insertion of the arm 41 in the cavity 47, the device 40 comprises a rod 52 fixed to the roof 4 and extending orthogonally to the axis H next to the arm 41 according to the axis H. The cavity 47 defines an insertion seat to guide the insertion of the rod 52 in the cavity 47, in particular in a sliding manner.

Hence, guiding the insertion of the rod 52 consequently also implies guiding the insertion of the arm 41.

The device 40 or, more in particular, the snap mechanism, could also be different from the advantageous one shown in the figures.

For instance, the device 40 could even be an automatic apparatus including sensors configured to detect the positioning of the roof 4 in the closed roof position and actuators configured to secure the roof 4 to the frame 2, in case the sensors detect the positioning of the roof 4 in the closed roof position.

On the contrary, the specific device 40 shown herein is completely mechanical, namely it lacks devices that have to be supplied with power or fluid or, more in general, require actuators.

This is convenient in terms of simplicity, effectiveness and reliability.

The device 40 further comprises a release member 54, which can be activated by hand in order to remove the second constraining action exerted by the device 40.

The release member 54 comprises, in this case, a lever 55 fixed to an arm 56, which, in turn, is fixed relative to the arm 41.

The arm 56 preferably forms one single piece with the arm 41.

The arm 56 radially extends from the axis H in a distinct manner relative to the arm 41.

In particular, the lever 55 is fixed relative to the arm 56 and, more in particular, is fixed to the latter, for example by means of one or more known fixing elements, such as for example screws, pins, rivets, etc.

Furthermore, the device 40 comprises, in particular, a ball grip or pin 57, which is fixed relative to the arm 56 and projects relative to the arm 56 along an axis K parallel to the axis H.

More in particular, the elastic element 48 couples the pin 57, which, in turn, is fixed relative to the arm 56 and/or to the arm 41, to the guide device 12. According to FIG. 6, for example, the elastic element 48 has a portion 48a going through a hole 65 made in the pin 57. The insertion of the portion in the pin 65 creates the coupling between the pin 57 and the elastic element 48.

More in detail, the hole 65 radially extends relative to the axis K and faces the elastic element 48.

In particular, the hole 65 is a through hole.

More in particular, the elastic element 48 completely goes through the hole 65, namely crosses the pin 57 from side to side.

In the embodiment shown herein, the elastic element 48 comprises a torsion spring having an end portion 48b fixed inside a hole 66 of the guide device 12, an intermediate portion 48c wound on a pin 67 and another end portion defined by the portion 48a, which goes through the pin 57 through the hole 65.

The pin 67 can be part of the device 40.

The pin 67 extends along an axis W parallel to the axes H, K and is fixed to the guide device 12.

The lever 55 is arranged so that it can be accessed and controlled by the user.

More in detail, the covering element 30 partially hides the device 40 from the view of the user, but has an opening 58, which communicates with a housing accommodating the lever 55.

The housing is defined by the covering element 30, in particular.

The opening 58 makes the housing accessible, for example from the passenger compartment of the motor vehicle 1. In this way, the lever 55 can be accessed by the user.

The lever 55 can be controlled by the user so as to cause the movement of the arm 41 from the second position to the first position, in particular against the elastic reaction of the elastic member 48.

More precisely, the lever 55 can be controlled by the user so as to cause the rotation of the arm 41 according to the first rotation direction.

This rotation can be used to release the hook end 42 from the coupling interface 38.

Preferably, the movement of the lever 55 or, more precisely, of a portion 60 thereof is guided by a guide, which is fixed relative to the roof 4. For example, the guide is defined by the covering element 30 and, more precisely, by its walls delimiting the housing of the lever 55.

The portion 60 substantially creates or defines a button, which can be pressed by the user, in particular by introducing the fingers in the housing of the lever 55 through the opening 58.

More in particular, the portion 60 can be pressed upwards by the user.

Hence, the user can push the portion 60 upwards, thus determining the movement of the arm 41 towards the first position.

In this case, the upward thrust of the portion 60 causes the rotation of the arm 41 according to the first rotation direction.

In fact, as shown in FIG. 7, the thrust is transferred from the lever 55 to the arm 56. Since the arm 56 is radial relative to the axis H and since the thrust is transversal relative to the axis H, a torque directed in the first rotation direction is generated as opposed to the elastic reaction torque of the elastic member 48.

The torque causes the rotation according to the second rotation direction and allows the arm 41 to get out of the recess 44.

Figure 8:
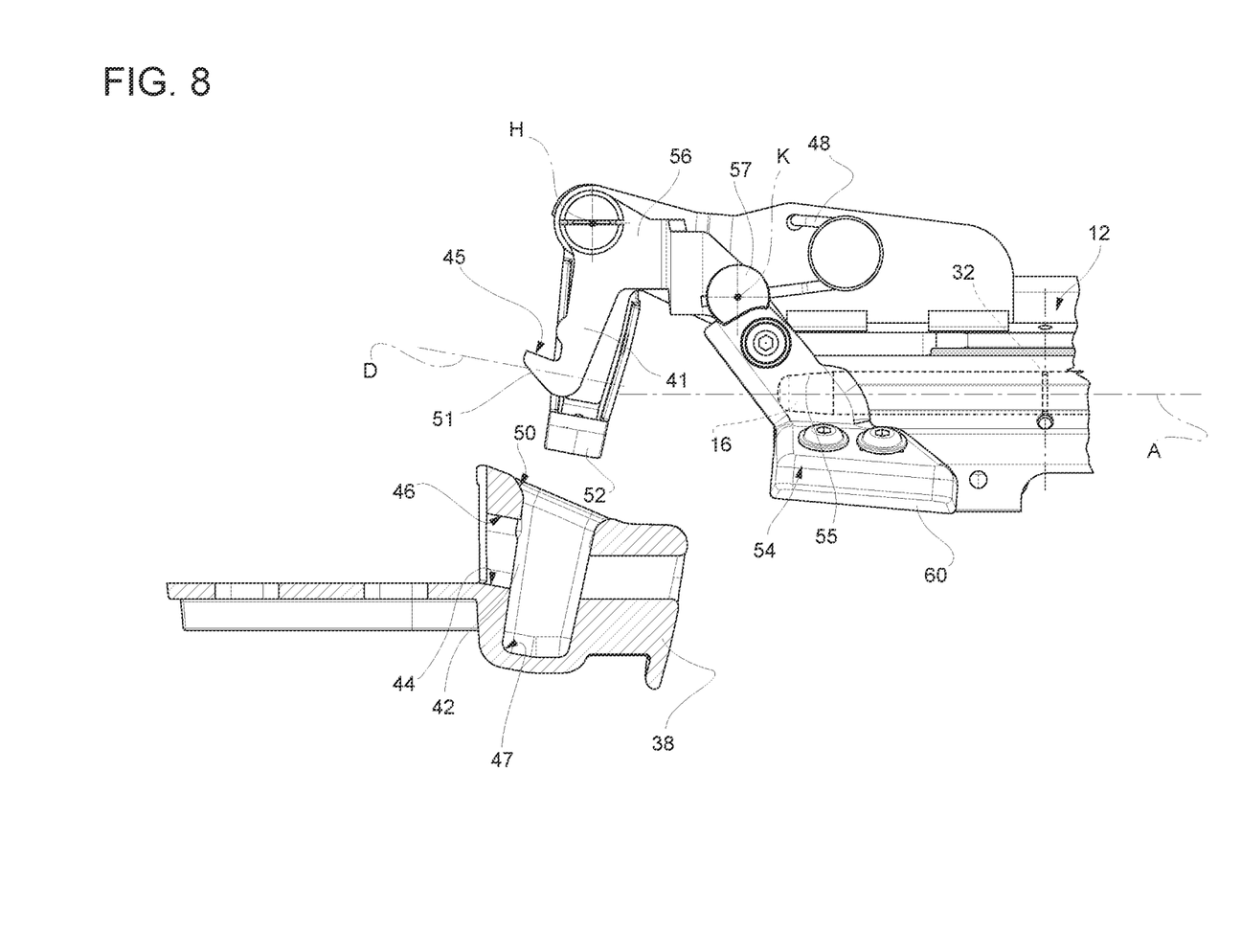
Figures 9, 10:
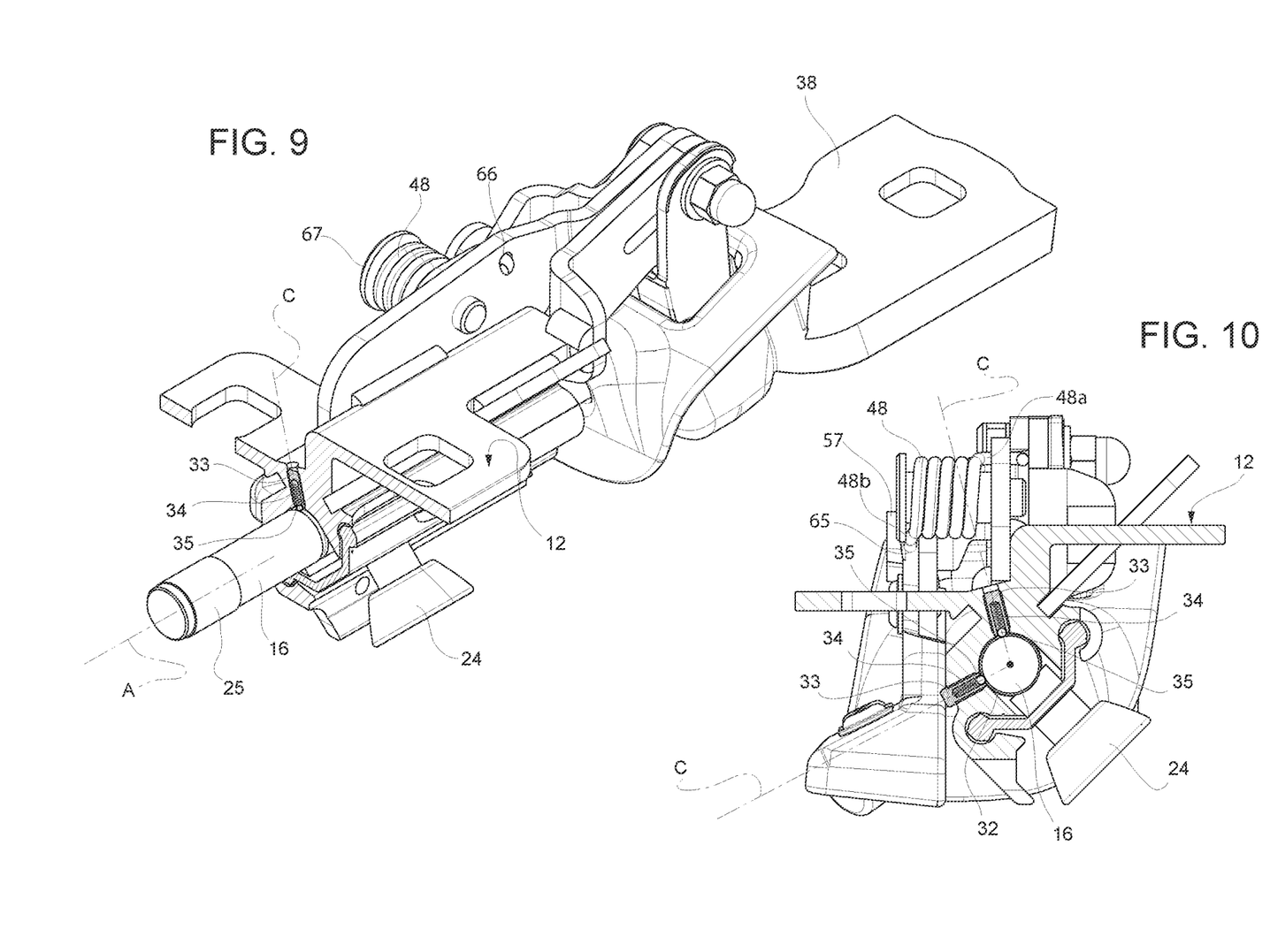
FIG. 9 is a top perspective and cut view of the locking assembly, wherein the cut view is cut along a first cross-section plane as defined by hatch mark (C)
FIG. 10 is a cross-section view of the locking assembly along the first cross-section plane.
Figures 11, 12:
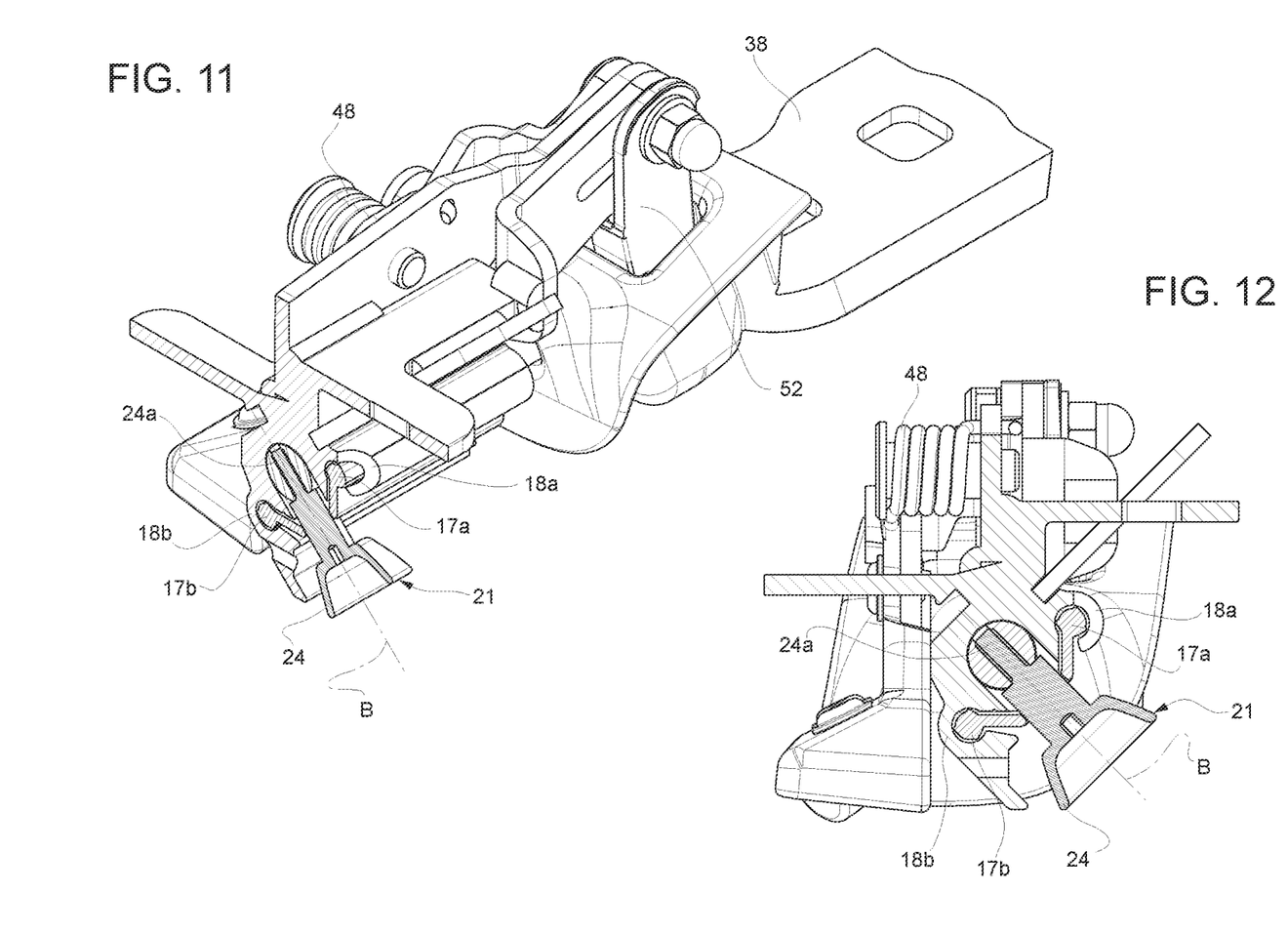
FIG. 11 is a top perspective view of the locking assembly wherein the cut view is cut along a second cross section plane as defined by hatch mark (B)
FIG. 12 is a cross-section view of the locking assembly along the second cross-section plane.

In this way, with the button pressed, the arm 41 can be extracted from the cavity 47 (FIG. 8).

Hence, the roof 4 is freed from the second constraining action. If the first constraining action was removed as well, the roof 4 is free relative to the frame 2 and can be removed.

A release of the button leads to the return of the arm 41 to the second position by means of the elastic member 48.

Owing to the above, the advantages of the assembly 11 according to the invention are evident.

The additional locking device 40 carries out the second constraining action with no need for further operations of the user besides a simple positioning of the roof 4 in the closed roof position.

In this way, even if the user forgets to apply the first constraining action by means of the lock bolts 8, the roof 4 is anyway secured to the frame 2.

This prevents the user from accidentally losing the roof 4 during the use of the motor vehicle 1.

The device 40 is structurally compact, simple to use and reliable. Therefore, the advantage of an increase in the safety of the motor vehicle 1 is not jeopardized by an excessive complication or size of the assembly 3.

The lock bolt 8 further features some improvements compared to the prior art.

For example, the fact that the guide body 12 is manufactured as one single piece and, more precisely, through extrusion reduces the manufacturing costs of the assembly 3, though without significant losses in terms of quality or operation effectiveness.

If necessary, those clearances due to a smaller accuracy of the diameter 14 of the hole compared to the designing conditions are compensated for by the bushings 25.

Furthermore, the user has a greater understanding of the position of the pin 16 through the feeling of resistance offered by the cooperation between the engagement element 35 and the grooves 32.

Finally, the assembly 3 according to the invention can be subjected to changes and variants, which, though, do not go beyond the scope of protection set forth in the appended claims.

In particular, the number and the shape of the components described and shown herein could be different and, in particular, could be changed with utmost freedom.

Furthermore, terms such as "first" and "second" are merely used for the sake of clarity and should not be interpreted with a limiting meaning.

The devices 40 could also be located in the area of the end 10. Or one single device 40 could be sufficient to carry out the second constraining action.

The invention claimed is:

1. A roof assembly for a convertible motor vehicle, the assembly comprising
a roof configured to be placed in contact with a frame of the motor vehicle in a closed roof position so as to close a passenger compartment of the motor vehicle from the top, and
a manual locking device carried by the roof and configured to be manually operated when the roof is in the closed roof position according to a first operating mode, according to which the manual locking device cooperates with the frame to carry out a first constraining action in order to secure the roof to the frame in the closed roof position, and according to a second operating mode, according to which the locking device refrains from cooperating with the frame, thus removing the first constraining action, and
an additional locking device carried by the roof and configured to automatically exert a second constraining action to secure the roof to the frame at least in response to a positioning or a movement of the roof into the closed roof position, the additional locking device comprising release means configured to be manually operated in order to remove the second constraining action,
wherein the manual locking device (5) comprises at least one lock bolt (8) comprising
a guide body, which is fixed relative to the frame, extends along a straight axis and has a hole along the straight axis, and
a pin coupled to the guide body so as to slide along the straight axis inside the hole between two lock bolt positions and configured to engage and disengage, respectively, a pin seat obtained on the frame when the pin is in one and in the other one of said two lock bolt positions, so that the engagement of the pin in the pin seat carries out the first constraining action, and
a knob fixed relative to the pin and projecting relative to the guide body along a first axis transversal to said straight axis through a slot obtained on the guide body and communicating with the hole, the knob being suitable for being grabbed by the user to move the pin between the two lock bolt positions.

2. The roof assembly according to claim 1, wherein the additional locking device comprises a snap coupling mechanism configured to secure the roof to the frame in response to the positioning or the movement of the roof into the closed roof position, thereby exerting the second constraining action.

3. The roof assembly according to claim 1, wherein the additional locking device comprises a first arm having a hook end configured to hook or be hooked to the frame, thus exerting the second constraining action.

4. The roof assembly according to claim 3, wherein the first arm is coupled to the roof so as to be movable relative to the roof between a first position, in which the roof can be placed in the closed roof position, and a second position to hook the hook end to the frame, the additional locking device further comprising elastic means coupling the first arm to the roof and configured to exert an elastic reaction towards the second position in response to a movement of the first arm from the second position towards the first position.

5. The roof assembly according to claim 1, wherein the lock bolt comprises a bushing, by means of which the pin is supported relative to the guide body in a sliding manner through the hole along the straight axis.

6. The roof assembly according to claim 1, wherein the guide body is manufactured as one single piece.

7. The roof assembly according to claim 6, wherein the guide body is manufactured through extrusion.

8. The roof assembly according to claim 1, wherein the pin has an outer side surface around the straight axis with two grooves around the straight axis, and wherein the guide body has a further hole communicating with said hole and extending along a second axis transversal to said straight axis, the lock bolt further comprising an engagement element configured to engage each one of the two grooves and a spring fixed to the engagement element inside the further hole and loaded to push the engagement element towards said straight axis, the further hole being arranged so that the spring causes the engagement element to engage one of the two grooves when the pin is in a corresponding one of the two lock bolt positions and the other one of the two grooves when the pin is in the other one of the two lock bolt positions.

9. A convertible motor vehicle comprising a frame and a roof assembly according to claim 1.

10. The motor vehicle according to claim 9, wherein the additional locking device comprises a first arm having a hook end configured to be hooked to the frame, thus exerting the second constraining action, wherein the first arm is coupled to the roof so as to be movable relative to the roof between a first position, in which the roof can be placed in the closed roof position, and a second position to hook the hook end to the frame, the additional locking device further comprising elastic means coupling the first arm to the roof and configured to exert an elastic reaction towards the second position in response to a movement of the first arm from the second position towards the first position, wherein the frame comprises a coupling interface having a guide surface shaped to accompany or determine the movement of the first arm from the second position to the first position in response to said positioning or movement, the coupling interface comprising a recess joined to the guide surface to allow the hook end to be hooked to the coupling interface getting into the recess through a further movement of the first arm from the first position to the second position caused by the elastic means.

11. The motor vehicle according to claim 10, wherein the manual locking device comprises at least one lock bolt comprising
    a guide body, which is fixed relative to the frame, extends along a straight axis and has a hole along the straight axis, and
    a pin coupled to the guide body so as to slide along the straight axis inside the hole between two lock bolt positions and configured to engage and disengage, respectively, a pin seat obtained on the frame when the pin is in one and in the other one of said two lock bolt positions, so that the engagement of the pin in the pin seat carries out the first constraining action, and
    a knob, which is fixed relative to the pin, projects relative to the guide body along a first transverse axis transversal to said straight axis through a slot obtained on the guide body and communicates with the hole, the knob being suitable for being grabbed by the user in order to move the pin between the two lock bolt positions,
wherein the coupling interface comprises the pin seat, which extends along a further straight axis directed towards the recess.

\* \* \* \* \*